(12) United States Patent
Otsuka et al.

(10) Patent No.: US 11,447,632 B2
(45) Date of Patent: Sep. 20, 2022

(54) EASILY TEARABLE FILM, MULTILAYER FILM, PACKAGING MATERIAL, AND CONTAINER

(71) Applicant: Mitsubishi Gas Chemical Company, Inc., Tokyo (JP)

(72) Inventors: Kosuke Otsuka, Hiratsuka (JP); Takafumi Oda, Hiratsuka (JP)

(73) Assignee: Mitsubishi Gas Chemical Company, Inc., Tokyo (JP)

(*) Notice: Subject to any disclaimer, the term of this patent is extended or adjusted under 35 U.S.C. 154(b) by 406 days.

(21) Appl. No.: 16/635,430

(22) PCT Filed: Jun. 29, 2018

(86) PCT No.: PCT/JP2018/024807
§ 371 (c)(1),
(2) Date: Jan. 30, 2020

(87) PCT Pub. No.: WO2019/026499
PCT Pub. Date: Feb. 7, 2019

(65) Prior Publication Data
US 2021/0087391 A1    Mar. 25, 2021

(30) Foreign Application Priority Data
Jul. 31, 2017    (JP) .............................. JP2017-147835

(51) Int. Cl.
*C08L 77/06*    (2006.01)
*C08J 5/18*    (2006.01)
(Continued)

(52) U.S. Cl.
CPC ................ *C08L 77/06* (2013.01); *B32B 7/12* (2013.01); *B32B 27/08* (2013.01); *B32B 27/32* (2013.01);
(Continued)

(58) Field of Classification Search
CPC .......... B32B 2307/582; B32B 2439/70; B32B 27/08; B32B 27/32; B32B 27/34;
(Continued)

(56) References Cited

U.S. PATENT DOCUMENTS

2007/0089798 A1    4/2007    Matsuo et al.
2009/0239013 A1    9/2009    Otaki et al.
(Continued)

FOREIGN PATENT DOCUMENTS

CN    1948397 A    4/2007
CN    101108898 A    1/2008
(Continued)

OTHER PUBLICATIONS

Office Action issued in corresponding Chinese Application No. 201880050307.9 dated Nov. 23, 2021 (9 pages).
(Continued)

*Primary Examiner* — Yan Lan
(74) *Attorney, Agent, or Firm* — Fitch, Even, Tabin & Flannery LLP

(57) ABSTRACT

An easily tearable film includes polyamide resin components including more than 20 parts by mass and 70 parts by mass or less of a semi-aromatic polyamide resin A and less than 80 parts by mass and 30 parts by mass or more of an aliphatic polyamide resin B; wherein the semi-aromatic polyamide resin A is constituted of a diamine-derived constituent unit and a dicarboxylic acid-derived constituent unit; 60 mol % or more of the diamine-derived constituent units are derived from metaxylylenediamine; 60 mol % or more of the dicarboxylic acid-derived constituent units are derived from an α,ω-linear aliphatic dicarboxylic acid having from 4 to 10 carbons; and the molar concentration of phosphorus atoms, the total molar concentration of alkali metal atoms and the total molar concentration of alkaline earth metal (Continued)

atoms, and Mn of the semi-aromatic polyamide resin satisfy predetermined relationships.

12 Claims, 3 Drawing Sheets

(51) Int. Cl.
*B32B 27/08* (2006.01)
*B32B 27/34* (2006.01)
*B32B 27/36* (2006.01)
*B32B 27/32* (2006.01)
*B32B 7/12* (2006.01)

(52) U.S. Cl.
CPC .............. *B32B 27/34* (2013.01); *B32B 27/36* (2013.01); *C08J 5/18* (2013.01); *B32B 2250/03* (2013.01); *B32B 2307/582* (2013.01); *B32B 2439/40* (2013.01); *B32B 2439/70* (2013.01); *B32B 2439/80* (2013.01); *C08L 2205/03* (2013.01)

(58) Field of Classification Search
CPC .. B32B 27/36; B32B 7/12; B32B 1/00; B32B 2250/03; B32B 2250/24; B32B 2255/10; B32B 2307/54; B32B 2307/732; B32B 2439/00; B32B 2439/40; B32B 2439/60; B32B 2439/80; B32B 27/18; B32B 27/20; B65D 65/40; B29L 2031/712; C08J 5/18; C08L 77/06; C08L 2205/03; C08L 77/00; B29K 2077/00; C08G 69/26; Y10T 428/13; Y10T 428/1303; Y10T 428/1352; Y10T 428/1359; Y10T 428/1379; Y10T 428/139; Y10T 428/31725; Y10T 428/31728; Y10T 428/3175; Y10T 428/31757

See application file for complete search history.

(56) References Cited

U.S. PATENT DOCUMENTS

| | | | |
|---|---|---|---|
| 2010/0304164 | A1 | 12/2010 | Sato et al. |
| 2012/0082861 | A1 | 4/2012 | Sato et al. |
| 2012/0263962 | A1 | 10/2012 | Sato et al. |
| 2013/0066041 | A1 | 3/2013 | Mitadera et al. |
| 2013/0219836 | A1 | 8/2013 | Sato et al. |
| 2013/0230693 | A1 | 9/2013 | Mitadera |
| 2014/0342145 | A1 | 11/2014 | Oguro et al. |
| 2015/0315357 | A1 | 11/2015 | Yamamoto et al. |
| 2015/0344642 | A1 | 12/2015 | Yamamoto et al. |
| 2015/0376377 | A1* | 12/2015 | Mii .......................... C08K 7/06 524/607 |
| 2016/0193813 | A1 | 7/2016 | Sato et al. |
| 2017/0030494 | A1 | 2/2017 | Sato et al. |
| 2018/0201744 | A1* | 7/2018 | Otsuka .................... C08L 77/06 |
| 2019/0010328 | A1 | 1/2019 | Oda et al. |

FOREIGN PATENT DOCUMENTS

| | | |
|---|---|---|
| CN | 101432365 A | 5/2009 |
| CN | 102731877 A | 10/2012 |
| CN | 102892835 A | 1/2013 |
| CN | 102906197 A | 1/2013 |
| CN | 102918080 A | 2/2013 |
| CN | 103249765 A | 8/2013 |
| CN | 103987782 A | 8/2014 |
| CN | 105451992 A | 3/2016 |
| CN | 105754332 A | 7/2016 |
| CN | 105778488 A | 7/2016 |
| CN | 106062074 A | 10/2016 |
| EP | 2554567 A1 | 2/2013 |
| EP | 2725066 A1 | 4/2014 |
| JP | H06-99491 A | 4/1994 |
| JP | 2008-024744 A | 2/2008 |
| JP | 2013-203414 A | 10/2013 |
| JP | 2016-169027 A | 9/2016 |
| JP | 2016-198912 A | 12/2016 |
| WO | 2007/139200 A1 | 12/2007 |
| WO | 2011/145497 A1 | 11/2011 |
| WO | 2011/145498 A1 | 11/2011 |
| WO | 2012/014772 A1 | 2/2012 |
| WO | 2012/077473 A1 | 6/2012 |
| WO | 2017/115685 A1 | 7/2017 |

OTHER PUBLICATIONS

Extended European Search Report issued in corresponding European Application No. 18842308.1 dated Jul. 9, 2020 (7 pages).
International Preliminary Report on Patentability and Written Opinion for PCT/JP2018/024807, dated Aug. 28, 2018, and English Translation submitted herewith (13 pages).
International Search Report for PCT/JP2018/024807, dated Aug. 28, 2018, and English Translation submitted herewith (5 pages).

\* cited by examiner

EASILY TEARABLE FILM, MULTILAYER FILM, PACKAGING MATERIAL, AND CONTAINER

CROSS-REFERENCE TO RELATED APPLICATIONS

This application is a U.S. national phase application filed under 35 U.S.C. § 371 of International Application Number PCT/JP2018/024807, filed Jun. 29, 2018, designating the United States, which claims priority from Japanese Application Number 2017-147835, filed Jul. 31, 2017.

FIELD OF THE INVENTION

The present invention relates to an easily tearable film, as well as a multilayer film, a packaging material, and a container produced using the easily tearable film.

BACKGROUND OF THE INVENTION

To prevent deterioration of products, such as foods and pharmaceuticals, and store them for a long period of time, packaging materials with excellent gas barrier properties are used for packaging food and the like. In addition, although plastic films are much used as materials for packaging products, such as foods, a plastic film for a packaging material alone often fails to achieve sufficient gas barrier performance. Accordingly, a packaging material is produced by laminating a plastic film having gas barrier properties on a plastic film for a packaging material.

However, a packaging material obtained by laminating a plastic film as described above may not be opened by tearing linearly, and when such a packaging material is opened obliquely, the content, if it is liquid, sometimes leaks out.

Accordingly, multilayer films with excellent linear cuttability have been studied. For example, Patent Document 1 discloses a linearly cuttable gas barrier package formed by laminating a biaxially stretched film (I) having linear cuttability in the longitudinal direction of the film, a gas barrier layer (II), a laminate adhesive layer (III), and a sealant layer (IV) in this order; characterized in that the biaxially stretched film (I) is a film containing nylon 6 and poly (metaxylylene adipamide) in a mass ratio [nylon 6/poly (metaxylylene adipamide)] of 80/20 to 95/5 or the biaxially stretched film (I) is a film containing a polyethylene terephthalate (PET) and a modified polybutylene terephthalate (modified PBT) in a mass ratio (PET/modified PBT) from 70/30 to 95/5, wherein the modified PBT is a polybutylene terephthalate containing from 5 to 20 mass % of a polytetramethylene glycol unit having a molecular weight from 600 to 4000; and the gas barrier layer (II) contains an inorganic layered compound (A) and a resin (B) in a volume ratio [inorganic layered compound (A)/resin (B)] from 3/97 to 7/93.

CITATION LIST

Patent Document

Patent Document 1: JP 2013-203414 A

SUMMARY OF INVENTION

However, the package in Patent Document 1 was found not to necessarily achieve sufficient linear cuttability. That is, it was found that in such a case as the production of the easily tearable film is scaled up, an aliphatic polyamide resin, such as polyamide 6, and a semi-aromatic polyamide resin, such as poly(metaxylylene adipamide), may be miscible during molding of the film and may affect the linear cuttability. In addition, even if having excellent linear cuttability, the film having poor oxygen barrier properties are not necessarily appropriate as a packaging material. Furthermore, a soft material is appropriate as a soft wrapper (soft packaging material). That is, the elastic modulus is desirably low.

An object of the present invention is to solve such problems and thus to provide an easily tearable film containing a semi-aromatic polyamide resin, such as a poly (metaxylylene adipamide), and an aliphatic polyamide resin, the easily tearable film having excellent linear cuttability, high oxygen barrier properties, and low elastic modulus, as well as a multilayer film, a packaging material, and a container produced using the easily tearable film.

As a result of investigations performed by the present inventor based on the above problems, it was found that the above problems can be solved when a semi-aromatic polyamide resin satisfies predetermined conditions in an easily tearable film containing the semi-aromatic polyamide resin and an aliphatic polyamide resin. Specifically, the above problems have been solved by the following means (1) and preferably by (2) to (10).

(1) An easily tearable film including polyamide resin components including more than 20 parts by mass and 70 parts by mass or less of a semi-aromatic polyamide resin A and less than 80 parts by mass and 30 parts by mass or more of an aliphatic polyamide resin B, with the proviso that a sum of the semi-aromatic polyamide resin A and the aliphatic polyamide resin B is 100 parts by mass; wherein the semi-aromatic polyamide resin A is constituted of a diamine-derived constituent unit and a dicarboxylic acid-derived constituent unit; 60 mol % or more of the diamine-derived constituent units are derived from metaxylylenediamine; 60 mol % or more of the dicarboxylic acid-derived constituent units are derived from an α,ω-linear aliphatic dicarboxylic acid having from 4 to 10 carbons; the semi-aromatic polyamide resin A satisfies Equation (1) below, and the easily tearable film is stretched;

$$[\text{molar concentration of phosphorus atoms} \times n - (\text{total molar concentration of alkali metal atoms} \times 1 + \text{total molar concentration of alkaline earth metal atoms} \times 2)]/Mn \leq 60 \quad (1)$$

where the molar concentration of the phosphorus atoms means molar concentration of phosphorus atoms of a phosphoric acid-related compound contained in the semi-aromatic polyamide resin A; the total molar concentration of the alkali metal atoms and the total molar concentration of the alkaline earth metal atoms mean respectively a total molar concentration of alkali metal atoms or a total molar concentration of alkaline earth metal atoms contained in the semi-aromatic polyamide resin A, both in μmol/g; the phosphoric acid-related compound is selected from phosphoric acid and salts thereof, phosphorous acid and salts thereof, and hypophosphorous acid and salts thereof; n means the number of releasable protons of the phosphoric acid-related compound; and Mn means a number average molecular weight of the semi-aromatic polyamide resin A in g/μmol.

(2) The easily tearable film according to (1), wherein the number average molecular weight of the semi-aromatic polyamide resin A is from 0.019 to 0.050 g/μmol.

(3) The easily tearable film according to (1) or (2), wherein constituent units including a linear alkylene chain having from 4 to 6 carbons accounts for 80 mol % or more of all the constituent units of the aliphatic polyamide resin B.

(4) The easily tearable film according to (1) or (2), wherein the aliphatic polyamide resin B includes polyamide 6.

(5) The easily tearable film according to any one of (1) to (4), wherein 60 mol % or more of the dicarboxylic acid-derived constituent units are derived from adipic acid.

(6) The easily tearable film according to any one of (1) to (5), wherein a melting point of the semi-aromatic polyamide resin A when the semi-aromatic polyamide resin A and the aliphatic polyamide resin B are kneaded and extruded for a residence time of 20 minutes is at least 1.0° C. higher than a melting point of a semi-aromatic polyamide resin C when the semi-aromatic polyamide resin C and the aliphatic polyamide resin B are kneaded and extruded for a residence time of 20 minutes;

where the semi-aromatic polyamide resin C is a semi-aromatic polyamide resin constituted of the same composition of the diamine and the dicarboxylic acid as that of the semi-aromatic polyamide resin A, and is a resin satisfying 230≥[molar concentration of phosphorus atoms×n−(total molar concentration of alkali metal atoms×1+total molar concentration of alkaline earth metal atoms×2)]/Mn>60.

(7) A multilayer film including the easily tearable film described in any one of (1) to (6).

(8) The multilayer film according to (7), including a polyester resin layer, the easily tearable film, and a polyolefin resin layer in this order.

(9) A packaging material including the easily tearable film described in any one of (1) to (6) or the multilayer film described in (7) or (8).

(10) A container including the easily tearable film described in any one of (1) to (6) or the multilayer film described in (7) or (8).

According to the present invention, an easily tearable film with excellent linear cuttability, high oxygen barrier properties, and low elastic modulus, as well as a multilayer film, a packaging material, and a container can be provided.

DESCRIPTION OF EMBODIMENTS

The contents of the present invention will be described in detail below. In the present specification, "from . . . to . . . " or " . . . to . . . " is used to mean that the numerical values described before and after "to" are included as the lower limit value and the upper limit value, respectively.

An easily tearable film of the present invention is characterized in that the easily terable film includes polyamide resin components including more than 20 parts by mass and 70 parts by mass or less of a semi-aromatic polyamide resin A and less than 80 parts by mass and 30 parts by mass or more of an aliphatic polyamide resin B, with the proviso that a sum of the semi-aromatic polyamide resin A and the aliphatic polyamide resin B is 100 parts by mass; and the semi-aromatic polyamide resin A is constituted of a diamine-derived constituent unit and a dicarboxylic acid-derived constituent unit; 60 mol % or more of the diamine-derived constituent units are derived from metaxylylenediamine; 60 mol % or more of the dicarboxylic acid-derived constituent units are derived from an α,ω-linear aliphatic dicarboxylic acid having from 4 to 10 carbons; the semi-aromatic polyamide resin A satisfies Equation (1) below, and the easily tearable film is stretched;

[molar concentration of phosphorus atoms×n−(total molar concentration of alkali metal atoms×1+ total molar concentration of alkaline earth metal atoms×2)]/Mn≤60 (1)

where the molar concentration of the phosphorus atoms means molar concentration of phosphorus atoms of a phosphoric acid-related compound contained in the semi-aromatic polyamide resin A; the total molar concentration of the alkali metal atoms and the total molar concentration of the alkaline earth metal atoms mean respectively a total molar concentration of alkali metal atoms or a total molar concentration of alkaline earth metal atoms contained in the semi-aromatic polyamide resin A, both in μmol/g; the phosphoric acid-related compound is selected from phosphoric acid and salts thereof, phosphorous acid and salts thereof, and hypophosphorous acid and salts thereof; n means the number of releasable protons of the phosphoric acid-related compound; and Mn means a number average molecular weight of the semi-aromatic polyamide resin A in g/μmol.

Figure 1:
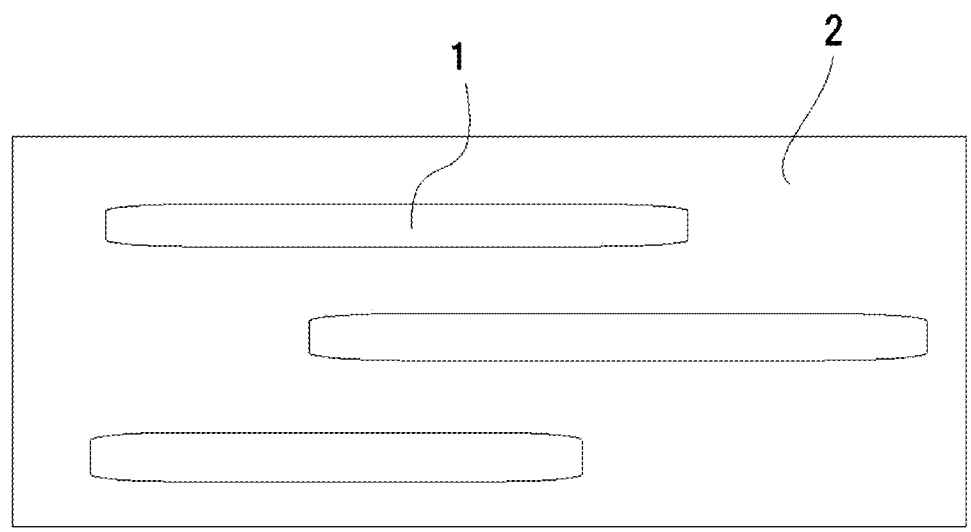
FIG. 1 is a schematic view of a cross section of an easily tearable film of the present invention in the MD direction.
Figure 2:
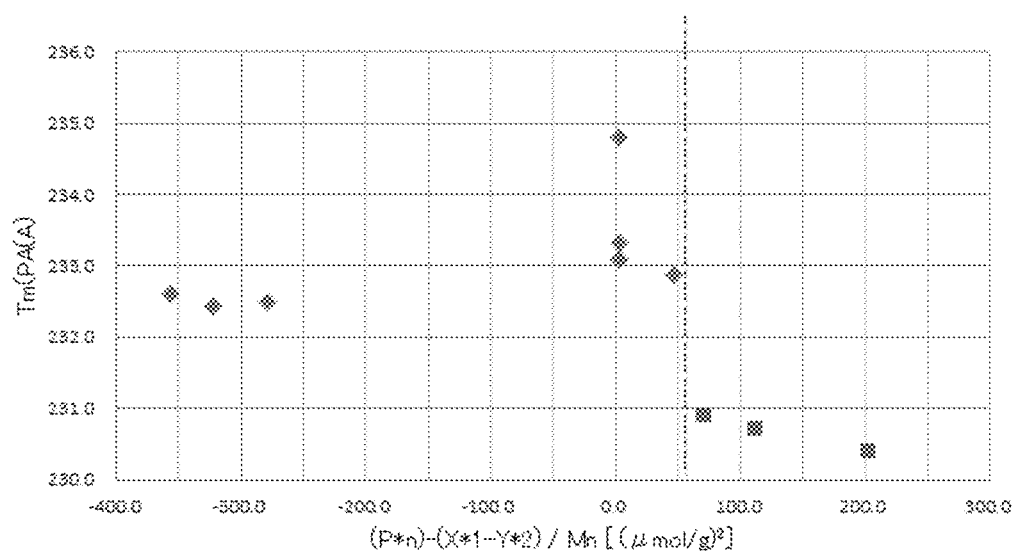
FIG. 2 is a graph plotting Examples 1 to 7 and Comparative Examples 1 to 3 of the present invention.

With such a constitution, a film with excellent linear cuttability is obtained. The reason, even if it is an estimation, is considered as follows. That is, to obtain a film with excellent linear cuttability, which is constituted of a semi-aromatic polyamide resin and an aliphatic polyamide resin, the semi-aromatic polyamide resin is desirably present linearly in the longitudinal direction of the easily tearable film without being miscible with the aliphatic polyamide resin. FIG. 1 illustrates a schematic view of a cross section of the easily tearable film of the present invention in the machine direction (MD direction), where 1 indicates a region where the semi-aromatic polyamide resin A is present, and 2 indicates a region where the aliphatic polyamide resin B is present. Desirably, after the semi-aromatic polyamide resin and the aliphatic polyamide resin are kneaded, extruded into a film shape, and stretched, the region where the semi-aromatic polyamide resin is present is present in a straight line along the direction of stretching as illustrated in FIG. 1. However, in view of increasing the productivity and ensuring stable production, the residence time of the composition containing the semi-aromatic polyamide resin and the aliphatic polyamide resin for the extrusion molding needs to be increased. In addition, it was found that if the residence time is extended, the semi-aromatic polyamide resin and the aliphatic polyamide resin become easily miscible, and the resulting easily tearable film has poor linear cuttability. That is, if the residence time is extended, the semi-aromatic polyamide resin and the aliphatic polyamide resin are miscible, and in turn the melting point of the semi-aromatic polyamide resin decreases. In other words, the melting point of the semi-aromatic polyamide resin A in the easily tearable film is an indicator of the degree of miscibilization between the semi-aromatic polyamide resin and the aliphatic polyamide constituting the easily tearable film. Furthermore, based on the melting point of the raw material semi-aromatic polyamide resin, the lower the decrease degree of the melting point of the semi-aromatic polyamide resin in the easily tearable film, the more the miscibilization is prevented. In the present invention, by adjusting the molar concentration of phosphorus atoms, the total molar concentration of the alkali metal atoms, and the total molar concentration of the alkaline earth metal atoms contained in the semi-aromatic polyamide resin A, and the number average molecular weight of the semi-aromatic polyamide resin A so that they satisfy predetermined values, the miscibilization of the semi-aromatic polyamide resin A and the aliphatic polyamide resin B has been prevented, and an easily tearable film with excellent linear cuttability has been successfully provided. Specifically, as illustrated in FIG. 2, it was studied to adjust the molar concentration of phosphorus atoms, the total molar concentration of the alkali metal atoms, and the total molar concentration of the alkaline earth metal atoms contained in the semi-aromatic polyamide resin, and the number average molecular weight of the semi-aromatic polyamide resin A so as to increase the melting point of the semi-aromatic polyamide resin A when the blend containing the semi-aromatic polyamide resin A and the aliphatic polyamide resin B is allowed to reside for 20 minutes. As a result, it was found that the decrease of the melting point of the semi-aromatic polyamide resin A when allowed to reside for 20 minutes is significantly prevented when [molar concentration of phosphorus atoms×n−(total molar concentration of alkali metal atoms×1+total molar concentration of alkaline earth metal atoms×2)]/Mn is 60 or less. Furthermore, by employing a specific type of the semi-aromatic polyamide resin A defined in the present invention, an easily tearable film with high oxygen barrier properties and low elastic modulus has been successfully provided.

Semi-Aromatic Polyamide Resin A

The semi-aromatic polyamide resin A used in the present invention (which may be referred to as the "polyamide A" in the present specification) is constituted of diamine-derived constituent units and dicarboxylic acid-derived constituent units; wherein 60 mol % or more of the diamine-derived constituent units are derived from metaxylylenediamine; 60 mol % or more of the dicarboxylic acid-derived constituent units are derived from an α,ω-linear aliphatic dicarboxylic acid having from 4 to 10 carbons; the semi-aromatic polyamide resin A satisfies Equation (1) below:

[molar concentration of phosphorus atoms×$n$−(total molar concentration of alkali metal atoms×1+ total molar concentration of alkaline earth metal atoms×2)]/$Mn$≤60 (1)

where the molar concentration of the phosphorus atoms means molar concentration of phosphorus atoms contained in the semi-aromatic polyamide resin A; the total molar concentration of the alkali metal atoms and the total molar concentration of the alkaline earth metal atoms mean respectively a total molar concentration of alkali metal atoms or a total molar concentration of alkaline earth metal atoms contained in the semi-aromatic polyamide resin A both in μmol/g; n means the number of releasable protons of a phosphoric acid-related compound; the phosphoric acid-related compound is selected from phosphoric acid and salts thereof, phosphorous acid and salts thereof, and hypophosphorous acid and salts thereof; and Mn means a number average molecular weight of the semi-aromatic polyamide resin A in g/μmol.

Here, the "semi-aromatic polyamide resin" refers to a polyamide resin in which from 30 to 70 mol % of total constituent units of the diamine-derived constituent units and the dicarboxylic acid-derived constituent units are constituent units containing an aromatic ring, and preferably from 40 to 60 mol % of the total constituent units of the diamine-derived constituent units and the dicarboxylic acid-derived constituent units are constituent units containing an aromatic ring.

The easily tearable film used in the present invention satisfies Equation (1) above. The lower limit value of the above [molar concentration of phosphorus atoms×n−(total molar concentration of alkali metal atoms×1+total molar concentration of alkaline earth metal atoms×2)] is not particularly specified but is, for example, −500 or more and preferably −400 or more. With such a range, a decrease in the melting point during the residence can be effectively prevented, that is, the miscibilization with the aliphatic polyamide resin B can be effectively prevented. The upper limit value of the above value can be, for example, 55 or less and 50 or less.

The molar concentration of phosphorus atoms contained in the semi-aromatic polyamide resin A is preferably 0.01 μmol/g or more, more preferably 0.05 μmol/g or more, and still more preferably 0.1 μmol/g or more. In addition, the upper limit value of the molar concentration of the phosphorus atoms is preferably 10 μmol/g or less, more preferably 8 μmol/g or less, still more preferably 6 μmol/g or less, even more preferably 5 μmol/g or less, even still more preferably 1 μmol/g or less, and further still more preferably 0.5 μmol/g or less. With such a range, a film with high linear cuttability, low degree of yellowness (YI), and superior productivity is obtained.

The total molar concentration of an alkali metal atom contained in the semi-aromatic polyamide resin A is preferably 0.05 μmol/g or more, more preferably 0.1 μmol/g or more, and still more preferably 0.2 μmol/g or more. The upper limit value of the total molar concentration of the alkali metal atom is preferably 20 μmol/g or less and more preferably 18 μmol/g or less, and may be even 1.0 μmol/g or less, 0.7 μmol/g or less, or 0.5 μmol/g or less. With such a range, a film with superior linear cuttability and productivity is obtained.

The molar concentration of sodium atoms contained in the semi-aromatic polyamide resin A is preferably 0.05 μmol/g or more, more preferably 0.1 μmol/g or more, and still more preferably 0.2 μmol/g or more. In addition, the upper limit value of the molar concentration of the sodium atoms is preferably 20 μmol/g or less, more preferably 18 μmol/g or less, still more preferably 10 μmol/g or less, even more preferably 7 μmol/g or less, even still more preferably 5 μmol/g or less, further still more preferably 1 μmol/g or less, and particularly even more preferably 0.5 μmol/g or less. With such a range, a film with superior linear cuttability and productivity is obtained.

The molar concentration of potassium atoms contained in the semi-aromatic polyamide resin A is preferably 20 μmol/g or less and more preferably 10 μmol/g or less, and may be even 1 μmol/g or less, particularly 0.1 μmol/g or less, and more particularly 0.01 μmol/g or less.

With such a range, a film with superior linear cuttability and productivity is obtained. The lower limit value of the molar concentration of the potassium atoms may be 0 μmol/g.

The total molar concentration of alkaline earth metal atoms contained in the semi-aromatic polyamide resin A is preferably 10 μmol/g or less and more preferably 5 μmol/g or less, and may be even 1 μmol/g or less, particularly 0.1 μmol/g or less, and more particularly 0.01 μmol/g or less. With such a range, a film with superior linear cuttability and productivity is obtained. The lower limit value of the total molar concentration of the alkaline earth metal atoms may be 0 mol/g.

The molar concentration of calcium atoms contained in the semi-aromatic polyamide resin A is preferably 10 μmol/g or less and more preferably 5 μmol/g or less, and may be even 1 µmol/g or less, particularly 0.1 µmol/g or less, and more particularly 0.01 µmol/g or less.

The phosphorus atom concentration as well as the alkali metal atom concentration and the alkaline earth metal atom concentration are measured according to the method described in the examples below. In a case where a measuring device described in the examples is difficult to obtain for a reason, such as discontinuation, another device having equivalent performance can be used. Hereinafter, the same applies to other measurement methods.

The number average molecular weight (Mn) of the semi-aromatic polyamide resin A is preferably 0.0190 g/µmol or more, more preferably 0.0200 g/µmol or more, still more preferably 0.0210 g/µmol or more, even more preferably 0.0215 g/µmol or more, and even still more preferably 0.0220 g/µmol or more. The upper limit value of the number average molecular weight of the semi-aromatic polyamide resin A is not particularly specified but is, for example, 0.0500 g/µmol or less, and even may be 0.0400 g/µmol or less or 0.0380 g/µmol or less. With such a range, a film with superior linear cuttability, moldability, and productivity is obtained.

The number average molecular weight of the semi-aromatic polyamide resin A is measured according to the method described in the examples below.

The melting point of the semi-aromatic polyamide resin A when the semi-aromatic polyamide resin A and the aliphatic polyamide resin B are kneaded and allowed to reside in an extruder for 20 minutes is preferably higher than 231.0° C., more preferably 231.5° C. or higher, still more preferably 232.0° C. or higher, and even more preferably 232.3° C. or higher. With such a range, a film with superior linear cuttability and productivity is obtained. The upper limit value of the melting point when the residence time of the semi-aromatic polyamide resin A is 20 minutes is not particularly specified but may be, for example, 240.0° C. or lower, particularly 238.0° C. or lower, and more particularly 235.0° C. or lower. The residence time is defined as the time required from when the polyamide resin in the hopper reaches the root part of the screw of the extruder until the polyamide resin exits the die.

In addition, in the present invention, the melting point of the semi-aromatic polyamide resin A when the semi-aromatic polyamide resin A and the aliphatic polyamide resin B are kneaded and extruded for a residence time of 20 minutes is preferably at least 1.0° C. higher than the melting point of a semi-aromatic polyamide resin C when the semi-aromatic polyamide resin C and the aliphatic polyamide resin B are kneaded and extruded for a residence time of 20 minutes. With such a constitution, a film with superior linear cuttability and productivity is obtained.

The semi-aromatic polyamide resin C is a semi-aromatic polyamide resin constituted of the same composition of the diamine and the dicarboxylic acid as the semi-aromatic polyamide resin A and is a resin that satisfies 230≥[molar concentration of phosphorus atoms×n−(total molar concentration of alkali metal atoms×1+total molar concentration of alkaline earth metal atoms×2)]/Mn>60. That is, the melting point of the semi-aromatic polyamide resin A when the raw material composition of the easily tearable film of the present invention is extruded and molded for a residence time of 20 minutes is preferably at least 1.0° C. higher than the melting point of the following semi-aromatic polyamide resin when the semi-aromatic polyamide resin A in the raw material composition of the easily tearable film of the present invention is replaced with this semi-aromatic polyamide resin (the semi-aromatic polyamide resin C) that includes the same composition of the diamine and the dicarboxylic acid and does not satisfy the Equation (1). The above melting point of the semi-aromatic polyamide resin A is preferably at least 1.5° C. higher than the melting point of the semi-aromatic polyamide resin C. In addition, the upper limit of the melting point is not particularly specified but is, for example, 5.0° C. or lower, and even may be 4.0° C. or lower and particularly may be 3.8° C. or lower.

The melting point when the residence time is 20 minutes refers to the melting point of the polyamide A measured by allowing a film to reside for 20 minutes with a differential scanning calorimeter, the film having the same composition as that of the easily tearable film of the present invention and a thickness of 250 µm, produced with a short residence time (for example, 2 minutes), which is less likely to affect the melting point. More specifically, the melting point is measured according to the description in the examples below.

The semi-aromatic polyamide resin A used in the present invention preferably satisfies at least two of the molar concentration of the phosphorus atoms, the total molar concentration of the alkali metal atoms and the total molar concentration of the alkaline earth metal atoms, the number average molecular weight, as well as the residence time, more preferably satisfies at least three thereof, and still more preferably satisfies all thereof.

The relative viscosity of the semi-aromatic polyamide resin A is preferably 2.4 or more, more preferably 2.5 or more, and still more preferably 2.6 or more. The upper limit of the relative viscosity is not particularly specified but can be, for example, 4.5 or less and even 4.0 or less. With such a range, a film with superior linear cuttability, moldability, and productivity is obtained.

The relative viscosity is determined by the following method.

First 0.2 g of the polyamide A is precisely weighed and dissolved in 20 mL of 96 mass % aqueous sulfuric acid solution by stirring at 25° C. After complete dissolution, 5 mL of the solution is quickly taken into a Cannon-Fenske viscometer, allowed to stand in a bath at a constant temperature of 25° C. for 10 minutes, and then the drop time (t) of the solution is measured. In addition, the drop time (t0) of the 96 mass % aqueous sulfuric acid solution itself is measured under the same conditions. The relative viscosity is calculated from t and t0 according to the following equation:

$$\text{Relative viscosity} = t/t0$$

The semi-aromatic polyamide resin A is constituted of the diamine-derived constituent unit and the dicarboxylic acid-derived constituent unit as described above. "Being constituted of the diamine-derived constituent unit and the dicarboxylic acid-derived constituent unit" refers to being constituted of the diamine-derived constituent unit and the dicarboxylic acid-derived constituent unit as main components. Thus, it is not completely excluded that the semi-aromatic polyamide resin A contains a constituent unit other than these constituent units, and it goes without saying that the semi-aromatic polyamide resin A may contain a constituent unit derived from a lactam, such as ε-caprolactam or laurolactam, or an aliphatic aminocarboxylic acid, such as aminocaproic acid or aminoundecanoic acid. Here, "main components" refers to that the total of the diamine-derived constituent unit and the dicarboxylic acid-derived constituent unit in the semi-aromatic polyamide resin A is the most abundant components among all the constituent units. In the present invention, the total of the diamine-derived constituent unit and the dicarboxylic acid-derived constituent unit in the semi-aromatic polyamide resin A preferably accounts for 90 mass % or more and more preferably accounts for 95 mass % or more of all the constituent units.

In the semi-aromatic polyamide resin A, 60 mol % or more of the diamine-derived constituent units are derived from metaxylylenediamine. Preferably 80 mol % or more, more preferably 90 mol % or more, and still more preferably 95 mol % or more of the diamine-derived constituent units are derived from metaxylylenediamine.

Diamines other than metaxylylenediamine can be exemplified by aliphatic diamines, such as paraxylylenediamine, tetramethylenediamine, pentamethylenediamine, 2-methylpentanediamine, hexamethylenediamine, heptamethylenediamine, octamethylenediamine, nonamethylenediamine, decamethylenediamine, dodecamethylenediamine, 2,2,4-trimethyl-hexamethylenediamine, and 2,4,4-trimethylhexamethylenediamine; alicyclic diamines, such as 1,3-bis(aminomethyl)cyclohexane, 1,4-bis(aminomethyl)cyclohexane, 1,3-diaminocyclohexane, 1,4-diaminocyclohexane, 2,2 bis(4-aminocyclohexyl)propane, bis(aminomethyl)decalin, and bis(aminomethyl)tricyclodecane; and diamines including an aromatic ring, such as bis(4-aminophenyl)ether, paraphenylenediamine, and bis(aminomethyl)naphthalene. One type, or two or more types thereof in a mixture can be used.

When a diamine other than metaxylylenediamine is used as the diamine component, the proportion thereof is preferably less than 20 mol % and more preferably 10 mol % or less of the diamine-derived constituent units.

In the semi-aromatic polyamide resin A, 60 mol % or more of the dicarboxylic acid-derived constituent units are derived from an α,ω-linear aliphatic dicarboxylic acid having from 4 to 10 carbons. Preferably 80 mol % or more, more preferably 90 mol % or more, and still more preferably 95 mol % or more of the dicarboxylic acid-derived constituent units are derived from an α,ω-linear aliphatic dicarboxylic acid having from 4 to 10 carbons.

The α,ω-linear aliphatic dicarboxylic acid having from 4 to 10 carbons preferably used as the raw material dicarboxylic acid component of the polyamide resin can be exemplified by aliphatic dicarboxylic acids, such as succinic acid, glutaric acid, pimelic acid, suberic acid, azelaic acid, adipic acid, and sebacic acid. One type, or two or more types thereof in a mixture can be used, but among them, adipic acid or sebacic acid is preferred, and adipic acid is more preferred in that the melting point of the polyamide resin is in an appropriate range for molding.

A preferred embodiment of the present invention is exemplified by a form in which 60 mol % or more of the dicarboxylic acid-derived constituent units are derived from adipic acid.

Dicarboxylic acid components other than the α,ω-linear aliphatic dicarboxylic acid having from 4 to 10 carbons can be exemplified by phthalic acid compounds, such as isophthalic acid, terephthalic acid, and orthophthalic acid; and naphthalene dicarboxylic acid compounds, such as 1,2-naphthalene dicarboxylic acid, 1,3-naphthalene dicarboxylic acid, 1,4-naphthalene dicarboxylic acid, 1,5-naphthalene dicarboxylic acid, 1,6-naphthalene dicarboxylic acid, 1,7-naphthalene dicarboxylic acid, 1,8-naphthalene dicarboxylic acid, 2,3-naphthalene dicarboxylic acid, 2,6-naphthalene dicarboxylic acid, and 2,7-naphthalene dicarboxylic acid. One type, or two or more types thereof in a mixture can be used. When a dicarboxylic acid other than the α,ω-linear aliphatic dicarboxylic acid having from 4 to 10 carbons is used as the dicarboxylic acid component, the proportion thereof is preferably less than 20 mol % and more preferably 10 mol % or less of the dicarboxylic acid-derived constituent units.

In the present invention, the dicarboxylic acid component other than the α,ω-linear aliphatic dicarboxylic acid having from 4 to 10 carbons can be configured to be substantially free of isophthalic acid. "Substantially free" refers to that the content is 2 mol % or less of the dicarboxylic acid component, and the content is preferably 1 mol % or less.

The content of the semi-aromatic polyamide resin A in the easily tearable film of the present invention is preferably more than 20 mass % and more preferably 25 mass % or more. The upper limit value of the content of the semi-aromatic polyamide resin A is preferably 70 mass % or less, more preferably 50 mass % or less, still more preferably less than 50 mass %, even more preferably 45 mass % or less, and even still more preferably 40 mass % or less.

Only one type, or two or more types of the semi-aromatic polyamide resins A may be used. When two or more types thereof are used, the total amount thereof is preferably within the above range.

Method for Producing Semi-Aromatic Polyamide Resin A

Next, an example of a method for producing the semi-aromatic polyamide resin A used in the present invention will be described. The semi-aromatic polyamide resin A used in the present invention is preferably a polyamide resin produced by the method described below, but it goes without saying that the semi-aromatic polyamide resin A is not limited thereto.

The method for producing the semi-aromatic polyamide resin A is exemplified by polycondensation of a diamine and a dicarboxylic acid in the presence of a phosphoric acid-related compound. The resulting semi-aromatic polyamide resin A synthesized in the presence of a phosphoric acid-related compound can have the phosphorus atom concentration of the predetermined value.

The polycondensation is typically a melt polycondensation method, and preferably a method involving adding dropwise a raw material diamine to a melted raw material dicarboxylic acid while increasing the temperature under pressure, and polymerizing the mixture while removing water resulting from condensation; or a method involving heating a salt constituted of a raw material diamine and a raw material dicarboxylic acid under pressure in the presence of water, and polymerizing the salt in a melted state while removing the added water and the water resulting from condensation.

The phosphoric acid-related compound is selected from phosphoric acid and salts thereof, phosphorous acid and salts thereof, and hypophosphorous acid and salts thereof. In addition, n is the number of releasable protons of the phosphoric acid-related compound, and for a monobasic acid, n in Equation (1) is 2. For a dibasic acid, n is 3. That is, because of oxidative deterioration during the polymerization, hypophosphorous acid and hypophosphites act substantially as a dibacic acid like phosphorous acid and phosphites, and phosphorous acid and phosphites act substantially as a tribasic acid like phosphoric acid and phosphate salts. In addition, tribasic acid is less prone to oxidative deterioration, and thus n is 3. That is, phosphoric acid and phosphate salts act substantially as a tribasic acid, and thus n is 3.

The phosphoric acid-related compound is preferably at least one type selected from alkali metal hypophosphites and alkaline earth metal hypophosphites, more preferably at least one type selected from alkali metal hypophosphites, and still more preferably sodium hypophosphite.

The alkali metal atom is exemplified by sodium, potassium, and lithium, and sodium is preferred. The alkaline earth metal is exemplified by calcium and magnesium.

In addition, the alkali metal atom and the alkaline earth metal atom that can be contained in the phosphoric acid-related compound are the alkali metal atoms and the alkaline earth metal atoms contained in the semi-aromatic polyamide resin A in Equation (1)

The method for quantifying the phosphoric acid-related compound contained in the semi-aromatic polyamide resin A is measured by $^{31}$P-NMR. More specifically, the measurement is performed in accordance with the method described in the examples below.

Examples of the phosphoric acid-related compound specifically include phosphinic acid compounds, such as dimethylphosphinic acid and phenylmethylphosphinic acid; hypophosphorous acid compounds, such as hypophosphorous acid, sodium hypophosphite, potassium hypophosphite, lithium hypophosphite, magnesium hypophosphite, calcium hypophosphite, and ethyl hypophosphite; phosphonic acid compounds, such as phosphonic acid, sodium phosphonate, lithium phosphonate, potassium phosphonate, magnesium phosphonate, calcium phosphonate, phenylphosphonic acid, ethylphosphonic acid, sodium phenylphosphonate, potassium phenylphosphonate, lithium phenylphosphonate, diethyl phenylphosphonate, sodium ethylphosphonate, and potassium ethylphosphonate; phosphonous acid compounds, such as phosphonous acid, sodium phosphonite, lithium phosphonite, potassium phosphonite, magnesium phosphonite, calcium phosphonite, phenylphosphonous acid, sodium phenylphosphonite, potassium phenylphosphonite, lithium phenylphosphonite, and ethyl phenylphosphonite; and phosphorous acid compounds, such as phosphorous acid, sodium hydrogen phosphite, sodium phosphite, lithium phosphite, potassium phosphite, magnesium phosphite, calcium phosphite, triethyl phosphite, triphenyl phosphite, and pyrophosphorous acid.

One type, or two or more types of these phosphoric acid-related compounds in combination can be used. In addition, these phosphoric acid-related compounds may be hydrates. Furthermore, the phosphoric acid-related compound that can be used in the present invention is not limited to these compounds.

The amount of the phosphoric acid-related compound to be added in the polycondensation system of the semi-aromatic polyamide resin A is preferably compounded so that the phosphorus atom concentration in the semi-aromatic polyamide resin A is within the above range.

Furthermore, in addition to the phosphoric acid-related compound, a polymerization rate modifier is preferably added in the polycondensation system of the semi-aromatic polyamide resin A. To prevent coloration of the semi-aromatic polyamide resin A during the polycondensation, a sufficient amount of the phosphoric acid-related compound needs to be present, but this could cause gelation of the polyamide resin. Thus, the polymerization rate modifier is preferably allowed to coexist to adjust the amidation reaction rate as well.

Examples of the polymerization rate modifier include alkali metal hydroxides, alkaline earth metal hydroxides, alkali metal acetates, and alkaline earth metal acetates, and alkali metal acetates are preferred.

The alkali metal atom is exemplified by sodium, potassium, and lithium, and sodium is preferred. The alkaline earth metal atom is exemplified by calcium and magnesium.

Specific examples of the polymerization rate modifier include lithium hydroxide, sodium hydroxide, potassium hydroxide, rubidium hydroxide, cesium hydroxide, magnesium hydroxide, calcium hydroxide, strontium hydroxide, barium hydroxide, lithium acetate, sodium acetate, potassium acetate, rubidium acetate, cesium acetate, magnesium acetate, calcium acetate, strontium acetate, and barium acetate. Among them, at least one type selected from sodium hydroxide, potassium hydroxide, magnesium hydroxide, calcium hydroxide, sodium acetate, potassium acetate, and calcium acetate is preferred, at least one type selected from sodium acetate, potassium acetate, and calcium acetate is more preferred, and sodium acetate is still more preferred.

Only one type, or two or more types of these polymerization rate modifiers in combination can be used.

In addition, the alkali metal atom and the alkaline earth metal atom that can be contained in the polymerization rate modifier can constitute the alkali metal atom and the alkaline earth metal atom contained in the semi-aromatic polyamide resin A in Equation (1).

The temperature of the polycondensation reaction is preferably from 150 to 300° C., more preferably from 160 to 280° C., and still more preferably from 170 to 270° C. With the temperature of the polycondensation reaction within the above range, the polycondensation reaction proceeds rapidly. In addition, thermal decomposition of a monomer, and an oligomer or a polymer during the polycondensation is unlikely to occur, which thus results in favorable properties of the resulting semi-aromatic polyamide resin A.

The time of the polycondensation reaction is typically from 1 to 5 hours after the start of the drop-wise addition of the diamine component. With the polycondensation reaction time within the above range, the molecular weight of the semi-aromatic polyamide resin A can be sufficiently increased, and the coloration of the resulting semi-aromatic polyamide resin A can be further prevented.

The semi-aromatic polyamide resin A obtained as described above is removed from the polymerization vessel and pelletized, and then dried and crystallized as necessary.

In addition, to increase the degree of polymerization of the semi-aromatic polyamide resin A, solid phase polymerization may be further performed. The solid phase polymerization can be performed by a well-known method, and examples thereof include a method involving heating at a temperature of 100° C. or higher and lower than the melting point of the polyamide A under reduced pressure for 1 to 24 hours.

Examples of a heating device that can be suitably used in the drying or solid phase polymerization include a continuous heating drying device; a rotary drum heating device, such as those referred to as a tumble dryer, a conical dryer, or a rotary dryer; and a conical heating device referred to as a Nauta mixer, which is equipped with a rotary blade in the inside thereof; but a well-known device can be used without limitation thereto.

In addition, the polyamide A is melt-kneaded with a compound containing an alkali metal atom in a high concentration and/or a compound containing an alkaline earth metal atom using an extruder or the like into pellets, and then the pellets may be blended with the polyamide A and the aliphatic polyamide resin B. Furthermore, to prevent separation of the polyamide A and the compound containing an alkali metal atom and/or the compound containing an alkaline earth metal atom after dry-blending, a viscous liquid may be adhered to the polyamide A as a spreader, and then the compound containing an alkali metal atom and/or the compound containing an alkaline earth metal atom may be added and mixed. The spreader is not particularly limited, and a surfactant or the like can be used.

Aliphatic Polyamide Resin B (Polyamide B)

The easily tearable film of the present invention contains the aliphatic polyamide resin B (which may be referred to as the "polyamide B" in the present specification).

Examples of the aliphatic polyamide resin B may include polyamide 6, polyamide 46, polyamide 66, polyamide 6,66, polyamide 11, polyamide 12, polyamide 1212, polyamide 1010, polyamide 1012, polyamide 1112, polyamide 610, polyamide 612, polyamide 69, and polyamide 810, and polyamide 6, polyamide 66, and polyamide 6,66 are preferred, and polyamide 6 is more preferred. "Polyamide 6" here refers to a polyamide resin including an ε-caprolactam-derived constituent unit, but may also contain a constituent unit derived from an additional raw material monomer within a range that does not depart from the spirit of the present invention (for example, 5 mol % or less, even 3 mol % or less, and particularly 1 mol % or less). The same applies to other aliphatic polyamide resins B.

More specifically, in the aliphatic polyamide resin B, a constituent unit including a linear alkylene chain having from 4 to 6 carbons preferably accounts for 80 mol % or more (preferably 90 mol % or more) of all the constituent units. Such a polyamide B is exemplified by polyamide 6, polyamide 66, and polyamide 6,66.

The relative viscosity of the aliphatic polyamide resin B is preferably 2.0 or more, more preferably 2.6 or more, and still more preferably 3.0 or more. The upper limit of the relative viscosity is not particularly specified, but a resin with high relative viscosity increases a load of the molding machine, thus a discharge amount must be reduced depending on the configuration of the molding machine, which reduces the productivity. The upper limit of the relative viscosity is, for example, 4.5 or less and can be even 4.0 or less. With such a range, a film having superior impact resistance as a soft packaging material and a superior productivity is obtained.

The content of the aliphatic polyamide resin B in the easily tearable film of the present invention is preferably 30 mass % or more, and more preferably 50 mass % or more, still more preferably more than 50 mass %, even more preferably 55 mass % or more, and even still more preferably 60 mass % or more. The upper limit value of the content of the aliphatic polyamide resin B is preferably less than 80 mass %, and more preferably 75 mass % or less.

Only one type, or two or more types of the aliphatic polyamide resin B may be used. When two or more types thereof are used, the total amount thereof is preferably within the above range.

Blend Ratio of Semi-Aromatic Polyamide Resin A and Aliphatic Polyamide Resin B

In the easily tearable film of the present invention, a blend ratio of the polyamide A and the polyamide B is more than 20 parts by mass and 70 parts by mass or less:less than 80 parts by mass and 30 parts by mass or more, preferably more than 23 parts by mass and 45 parts by mass or less:less than 77 parts by mass and 55 parts by mass or more, and more preferably from 25 parts by mass to 45 parts by mass:from 75 parts by mass to 55 parts by mass. Here, the total amount of the polyamide A and the polyamide B is 100 parts by mass. With such a range, an easily tearable film with superior linear cuttability, oxygen barrier properties, and flexibility is obtained.

Additional Additive

The easily tearable film of the present invention is molded from a composition containing polyamide resin components including the semi-aromatic polyamide resin A and the aliphatic polyamide resin B. The composition may consist merely of the polyamide resin components or may contain an additional component.

Examples of the additional component include polyamide resins other than the polyamide resin components; thermoplastic resins other than the polyamide resin components; and additives, such as fillers, matting agents, heat resistant stabilizers, weather resistant stabilizers, antioxidants, ultraviolet absorbers, plasticizers, flame retardants, antistatic agents, anti-coloration agents, anti-gelling agents, impact modifiers, lubricants, colorants, and electrically conductive additives. One type each, or two or more types of these additives may be contained. Details thereof can be considered with reference to the description in paragraphs [0130] to [0155] of JP 4894982 B, the contents of which are incorporated in the present specification.

An embodiment of the present invention is exemplified by an easily tearable film that is substantially free of an additional phosphorus atom-containing compound other than the phosphoric acid-related compound contained in the polyamide A. "Substantially free" refers to that the content of the additional phosphorus atom-containing compound is 1 mass % or less of the phosphoric acid-related compound contained in the polyamide A, and the content is preferably 0.1 mass % or less.

In the easily tearable film of the present invention, preferably 90 mass % or more and more preferably 95 mass % or more of the resin components constituting the film are the polyamide resin components (the semi-aromatic polyamide resin A and the aliphatic polyamide resin B).

In addition, in the easily tearable film of the present invention, preferably 90 mass % or more and more preferably 95 mass % or more of the components constituting the film are constituted of the resin components (such as the polyamide resin components, an additional polyamide resin, an additional thermoplastic resin, and an impact modifier).

Property of Easily Tearable Film

The easily tearable film of the present invention can have an oxygen permeability coefficient at 23° C. and a relative humidity of 60% of 0.32 cc·mm/(m$^2$·day·atm) or less, even 0.30 cc·mm/(m$^2$·day·atm) or less, and particularly 0.28 cc·mm/(m$^2$·day·atm) or less. The lower limit value of the oxygen permeability coefficient at 23° C. and relative humidity of 60% is desirably 0 cc·mm/(m$^2$·day·atm), but even 0.1 cc·mm/(m$^2$·day·atm) or higher can sufficiently satisfy the required performance. With such a range, the easily tearable film can be suitably used as a food packaging material.

The easily tearable film of the present invention preferably has a tensile elastic modulus of 3.3 MPa or less, more preferably 3.1 MPa or less, and still more preferably 2.9 MPa or less in accordance with ASTM-D882. With such a range, the easily tearable film has flexibility that can be used as a soft wrapper (soft packaging material) while having, oxygen barrier properties. The lower limit value of the tensile elastic modulus is not particularly specified but, for example, is practically 1.5 MPa or more.

The oxygen permeability coefficient and the tensile elastic modulus are more specifically measured according to the methods described in the examples below.

The easily tearable film of the present invention preferably satisfies both the oxygen permeability coefficient and the tensile elastic modulus.

Method for Producing Easily Tearable Film

In the easily tearable film of the present invention, the polyamide resin film is stretched. The stretching may be uniaxial stretching or biaxial stretching but is preferably biaxial stretching. When the film is uniaxially stretched, the stretch ratio is preferably from 1.1 to 5.0 times, more preferably from 1.8 to 4.0 times, and still more preferably from 2.5 to 3.5 times. In the case of biaxial stretching, the film is stretched preferably in the TD direction and the MD direction each at the above stretch ratio. In the case of biaxial stretching, a total stretch ratio obtained by multiplying the stretch ratios of the TD direction and the MD direction is preferably from 1.2 to 25 times, more preferably from 3.2 to 16 times, and still more preferably from 6.3 to 12.3 times.

The present invention, in particular, is valuable in that high linear cuttability of the resulting easily tearable film can be maintained even if the residence time in the extruder is longer than that in the related art. For example, the residence time in the extruder can be 15 minutes or longer and even 19 minutes or longer. The upper limit of the residence time is, for example, 25 minutes or shorter. In addition, in the present invention, the residence time for kneading and extruding the semi-aromatic polyamide resin A and the aliphatic polyamide resin B can be not longer than 0.5 times and even from 0.05 to 0.5 times the residence time for kneading and extruding the semi-aromatic polyamide resin C and the aliphatic polyamide resin B.

The method for producing a stretched film can be considered with reference to the description in WO 2017/010390.

The easily tearable film of the present invention can be used as a monolayer film The thickness of the easily tearable film of the present invention only needs to be appropriately selected according to the application and is not particularly limited. However, in terms of film strength, impact resistance, barrier properties, ease of dry lamination, and cost, the thickness can be from 10 to 50 μm, even from 12 to 40 μm, and particularly from 14 to 30 μm.

The monolayer film can be preferably used in plastic wraps; or pouches of various shapes; container lid materials; and packaging containers, such as bottles, cups, trays, and tubes. Details of the container will be described below.

The present invention also discloses a multilayer film including the easily tearable film of the present invention. Furthermore, the present invention discloses a multilayer film including a polyester resin layer, the easily tearable film of the present invention, and a polyolefin resin layer in this order. The polyester resin is preferably a polyethylene terephthalate resin, and the polyolefin resin is preferably a polypropylene resin and a polyethylene resin.

These multilayer films are exemplified by methods, such as a dry lamination method involving adhering a polyester resin film, the easily tearable film of the present invention, and a polyolefin resin film in this order with an adhesive or the like, and a method involving coextruding a composition containing the semi-aromatic polyamide resin A and the aliphatic polyamide resin B, and a composition containing a polyolefin resin to produce a multilayer film.

The multilayer film can be preferably used in plastic wraps; or pouches of various shapes; container lid materials; and packaging containers, such as bottles, cups, trays, and tubes. Details of the container will be described below.

Figure 3:
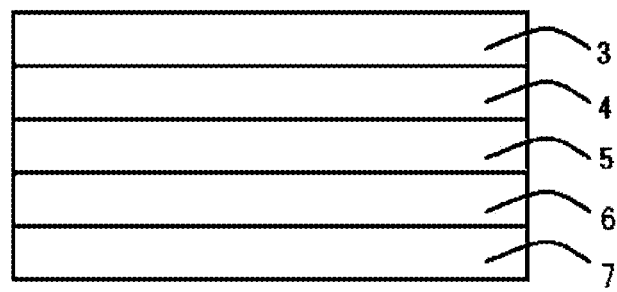
FIG. 3 is a schematic view illustrating an example of a multilayer film of the present invention.

FIG. 3 is an example of a multilayer film of the present invention, where 3 is a polyester resin film, 4 is an adhesive layer, 5 is an intermediate layer (the easily tearable film of the present invention), 6 is an adhesive layer, and 7 is a polyolefin resin film. In FIG. 3, the adhesive layer 4 and the adhesive layer 6 each may be the same or different.

The polyester resin film is preferably a vapor deposited polyester resin film. The thickness of the polyester resin film is preferably from 8 to 50 μm and more preferably from 10 to 20 μm.

The polyolefin resin film is preferably a polyethylene resin film or a polypropylene resin film, and more preferably a polypropylene resin film. The thickness of the polyolefin resin film is preferably from 10 to 500 μm and more preferably from 20 to 100 μm.

The total thickness of the multilayer film of the present invention is preferably from 0.1 to 2.5 mm.

The adhesive layer is preferably an adhesive for dry lamination having adhesiveness. Examples of the adhesive for dry lamination include one-part urethane-based adhesives in which a urethane-based adhesive including an isocyanate group is used alone; and two-part urethane-based adhesives which are used by mixing two liquids, a main agent including a hydroxyl group and a curing agent including an isocyanate group; and in particular, two-part urethane-based adhesives are preferred.

The thickness of the adhesive layer is preferably from 2 to 30 μm, more preferably from 3 to 20 μm, and still more preferably from 4 to 10 μm in terms of ensuring mechanical strength of the multilayer film while exhibiting practical adhesive strength In addition, a sealant layer may be disposed on one or both surfaces of the stretched laminated film of the present invention. Various flexible polymer films having heat sealability can be used as a film material constituting the sealant layer, and the film material only needs to be appropriately selected among them according to the purpose and application. In view of exhibiting good heat sealability, preferably used are a low-density polyethylene, a high-density polyethylene, a linear low-density polyethylene, a polypropylene, a polybutene, a copolymer thereof, an ionomer resin, an ethylene-acrylic acid copolymer, an ethylene-vinyl acetate copolymer, a modified polyolefin resin, and a mixture thereof. Among them, a low-density polyethylene, a high-density polyethylene, a linear low-density polyethylene, and a polypropylene are preferably used. The surface of these films may be subjected to a surface treatment of various types, such as flame treatment and corona discharge treatment. The thickness of the sealant layer is preferably in the range of 5 to 300 μm, more preferably 5 to 100 μm, and still more preferably 5 to 80 μm.

The present invention also discloses a packaging material including the easily tearable film of the present invention or the multilayer film of the present invention. The packaging material of the present invention can be preferably used in plastic wraps; or pouches of various shapes; container lid materials; and packaging containers, such as bottles, cups, trays, and tubes.

The container (preferably a multilayer container) can contain and store an article of various types preferred to visualize the content to enhance customers' purchase desire. Examples thereof include processed marine products, processed livestock products, rice, and liquid foods. In particular, the container is suitable for storing foods that are heat-sterilized at high temperature of 100° C. or higher and are susceptible to the influence of oxygen. Details thereof can be considered with reference to the description in paragraphs [0032] to [0035] of JP 2011-37199 A, the contents of which are incorporated in the present specification.

EXAMPLES

The present invention will be described more specifically with reference to examples below. Those described in the examples below, such as materials, amounts used, proportions, processing contents, and processing procedures, may be changed as appropriate as long as the change does not depart from the spirit of the present invention. Thus, the scope of the present invention is not limited to the specific examples described below.

Semi-Aromatic Polyamide Resin A (Polyamide A)
Synthesis of Polyamide A1

To 8.9 kg of adipic acid, 17.9 g of sodium hypophosphite monohydrate and 9.3 g of sodium acetate were added, and the mixture was heated and melted at 170° C. and 0.1 MPaA in a reactor, then 8.3 kg of metaxylylenediamine was gradually added dropwise over 2 hours while the content was being stirred, and the temperature was increased to 250° C. After the temperature was increased, the pressure was slowly reduced to 0.08 MPaA over 1 hour and maintained for 0.5 hours. After completion of the reaction, the content in a strand shape was removed and pelletized with a pelletizer, and 15 kg of pellets were obtained. The resulting pellets were charged in a tumbler (a rotary vacuum chamber) including an outer cover for heating a heating medium, heating at 180° C. was continued for 1 hour under reduced pressure (from 0.5 to 10 Torr) to subject the resulting pellets to solid phase polymerization, and a polyamide A1 (MXD6, melting point 237° C., number average molecular weight (Mn) 0.0185 g/μmol, phosphorus concentration 11.2 μmol/g, sodium concentration 18.7 μmol/g, and moisture content 0.05 mass %) was obtained.

Synthesis of Polyamide A2

Synthesis was performed in the same manner as in the synthesis of the polyamide A1 with the exception that 8.2 kg of metaxylylenediamine was added dropwise, 7.8 g of sodium hypophosphite monohydrate and 4.0 g of sodium acetate were added, and the solid-phase polymerization was performed at 200° C., and a polyamide A2 (MXD6, melting point 237° C., number average molecular weight (Mn) 0.0146 g/μmol, phosphorus concentration 4.9 μmol/g, sodium concentration 8.1 μmol/g, and moisture content 0.05 mass %) was obtained.

Synthesis of Polyamide A3

Synthesis was performed in the same manner as in the synthesis of the polyamide A1 with the exception that 8.3 kg of metaxylylenediamine was added dropwise, 7.8 g of sodium hypophosphite monohydrate and 4.0 g of sodium acetate were added, and the solid-phase polymerization was performed at 200° C., and a polyamide A3 (MXD6, melting point 237° C., number average molecular weight (Mn) 0.0229 g/mol, phosphorus concentration 4.9 μmol/g, sodium concentration 8.1 μmol/g, and moisture content 0.05 mass %) was obtained.

Synthesis of Polyamide A4

Synthesis was performed in the same manner as in the synthesis of the polyamide A1 with the exception that 8.3 kg of metaxylylenediamine was added dropwise, 7.8 g of sodium hypophosphite monohydrate and 4.0 g of sodium acetate were added, and the solid-phase polymerization was performed at 200° C. for 2 hours, and a polyamide A4 (MXD6, melting point 237° C., number average molecular weight (Mn) 0.0348 g/μmol, phosphorus concentration 4.9 μmol/g, sodium concentration 8.1 μmol/g, and moisture content 0.05 mass %) was obtained.

Synthesis of Polyamide A5

Synthesis was performed in the same manner as in the synthesis of the polyamide A1 with the exception that 8.3 kg of metaxylylenediamine was added dropwise, 0.3 g of sodium hypophosphite monohydrate and 0.1 g of sodium acetate were added, and the solid-phase polymerization was performed at 200° C., and a polyamide A5 (MXD6, melting point 237° C., number average molecular weight (Mn) 0.0225 g/μmol, phosphorus concentration 0.2 μmol/g, sodium concentration 0.3 μmol/g, and moisture content 0.05 mass %) was obtained.

Synthesis of Polyamide A6

To 8.9 kg of adipic acid, 0.3 g of sodium hypophosphite monohydrate and 0.1 g of sodium acetate were added, and the mixture was heated and melted at 170° C. and 0.1 MPaA in a reactor, then 8.3 kg of metaxylylenediamine was gradually added dropwise over 2 hours while the content was being stirred, and the temperature was increased to 250° C. After the temperature was increased, the pressure was slowly reduced to 0.08 MPaA over 1 hour and maintained for 0.5 hours. After completion of the reaction, the content in a strand shape was taken out and pelletized with a pelletizer, and 15 kg of pellets X of a polymetaxylylenediamine were obtained.

Using an extruder in which a twin screw extruder (model: TEM37BS, available from Toshiba Machine Co., Ltd., bore diameter: 37 mm) was equipped with a strand die, which is provided with a 100-mesh filter, 97.36 parts by mass of the pellet X and 2.64 parts by mass of sodium acetate were each fed with separate feeders and formed into a strand shape. During this operation, the heater temperature of the extruder was set to 280° C. Then, the strand was cooled in a water-cooled bath and then pelletized using a pelletizer. Chips were removed by sieving, and a master batch Y was obtained.

Then, 3.0 parts by mass of the resulting master batch Y and 97.0 parts by mass of the polyamide A3 were dry-blended, and a polyamide A6 was obtained. The polyamide A6 was MXD6 and had a melting point of 237° C., a number average molecular weight (Mn) of 0.0226 g/μmol, a phosphorus concentration of 4.7 μmol/g, a sodium concentration of 17.5 μmol/g, and a moisture content of 0.05 mass %.

Synthesis of Polyamide A7

To 91.8 parts by mass of the polyamide A3, 8.2 parts by mass of 10 mass % aqueous potassium acetate solution was blended, and the blend was charged in a vacuum dryer. Heating at 150° C. was continued for 2 hours under reduced pressure (from 0.5 to 10 Torr) to vacuum dry the resulting pellets, and a polyamide A7 (MXD6, melting point 237° C., number average molecular weight (Mn) 0.0229 g/μmol, phosphorus concentration 4.9 μmol/g, sodium concentration 8.1 μmol/g, potassium concentration 9.0 μmol/g, and moisture content 0.05 mass %) was obtained.

Synthesis of Polyamide A8

To 93.4 parts by mass of the polyamide A3, 6.6 parts by mass of 10 mass % aqueous calcium acetate monohydrate solution was blended, and the blend was charged in a vacuum dryer. Heating at 150° C. was continued for 2 hours under reduced pressure (from 0.5 to 10 Torr) to vacuum dry the resulting pellets, and a polyamide A8 (MXD6, melting point 237° C., number average molecular weight (Mn) 0.0229 g/μmol, phosphorus concentration 4.9 μmol/g, sodium concentration 8.1 μmol/g, calcium concentration 4.0 μmol/g, and moisture content 0.05 mass %) was obtained.

Measurement of Phosphorus Atom Concentration

The phosphoric acid-related compound contained in the semi-aromatic polyamide resin A was quantified by $^{31}$P-NMR. Specifically, 2.2 mL of 1,1,1,3,3,3-hexafluoroisopropanol (HFIP) was added to 200 mg of the semi-aromatic polyamide resin A to dissolve the resin with an ultrasonic cleaner at room temperature, and then 0.3 mL of heavy benzene and 0.1 mL of trifluoroacetic acid were added. Then, 0.1 mL of a hexafluoro-2-propanol (HFIP) solution of tris(4-tert-butylphenyl) phosphate (CAS No. 78-33-1, available from Sigma-Aldrich Co. LLC) (concentration of 3.2 mg/mL) was added to the resulting solution, and the solution was made uniform with an ultrasonic cleaner. The phosphorus atom concentration of tris(4-tert-butylphenyl) phosphate in the resulting solution corresponds to 3.23 μmol/g of the semi-aromatic polyamide resin A. The resulting solution was subjected to structural analysis ($^{31}$P-NMR method) for the phosphorus compound in the polyamide with a Fourier transform nuclear magnetic resonance apparatus (FT-NMR, AVANCE-500III, available from BRUKER). The analysis was performed under conditions of a $^{31}$P resonance frequency of 202.5 MHz, a flip angle of the detection pulse of 45°, a data acquisition time of 1.5 seconds, a delay time of 1.0 seconds, an integration number of 80000, and a measurement temperature of 300 K. The phosphorus peak integral value Ps of each phosphorus-containing compound was calculated with the phosphorus peak integral value of tris (4-tert-butylphenyl) phosphate being 3.23, and the phosphorus atom concentration was calculated by the following formula.

Phosphorus atom concentration (μmol/g)=$Ps$

Measurement of Alkali Metal Atom Concentration and Alkaline Earth Metal Atom Concentration The alkali metal atom and alkaline earth metal atom concentrations of the polyamide A was measured according to the following method.

In a container made of polytetrafluoroethylene, 0.2 g of the polyamide A and 8 mL of 35 mass % aqueous nitric acid solution were placed and subjected to a microwave decomposition at an internal temperature of 230° C. for 30 minutes. The decomposition liquid was adjusted to a predetermined volume with ultrapure water and this solution was used as an ICP (trace element extraction) measurement solution. The resulting measurement solution was measured by ICP emission spectroscopy for the concentrations of alkali metal atoms (periodic table group 1 atoms, i.e., lithium, sodium, potassium, rubidium, cesium, and francium) and alkaline earth metal atoms (periodic table group 2 atoms, i.e., beryllium, magnesium, calcium, strontium, barium, and radium).

In the present examples, the microwave decomposition was carried out using ETHOS One available from Milestone General. An ICP emission spectrophotometer ICPE-9000 available from Shimadzu Corporation was used.

Measurement of Number Average Molecular Weight (Mn)

In a mixed solvent of phenol/ethanol=4/1 (volume ratio), 0.3 g of the polyamide A was added and stirred at 20 to 30° C. to be completely dissolved. Then, under stirring, the inner wall of the vessel was rinsed with 5 mL of methanol, and the terminal amino group concentration [NH$_2$] was determined by neutralization titration with 0.01 mol/L aqueous hydrochloric acid solution. In addition, 0.3 g of the polyamide resin was added in benzyl alcohol and stirred at 160 to 180° C. under a nitrogen stream to be completely dissolved. Then, the mixture was cooled to 80° C. or lower under a nitrogen stream. Under stirring, the inner wall of the vessel was rinsed with 10 mL of methanol, and the terminal carboxyl group concentration [COOH] was determined by neutralization titration with 0.01 mol/L aqueous sodium hydroxide solution. The number average molecular weight was determined from the measured terminal amino group concentration [NH$_2$] (unit: μeq/g) and the measured terminal carboxyl group concentration [COOH] (unit: μeq/g) by the following equation.

Number average molecular weight ($Mn$)=2/ ([COOH]+[NH$_2$])

$[P \times n - (X \times 1 + Y \times 2)]/Mn$

The various values obtained above were substituted into Equation (1) above to yield a value. P represents the phosphorus atom concentration of the polyamide A (unit: μmol/g), X represents the total concentration of the alkali metal atoms of the polyamide A (unit: μmol/g), Y represents the total concentration of the alkaline earth metal atoms of the polyamide A (unit: μmol/g), and n means the valence of the phosphoric acid-related compound contained in the polyamide resin A. In the present example, a hypophosphite, which acts substantially as a dibasic acid, was used, and thus n is 2. Mn represents the number average molecular weight (unit: g/μmol) of the polyamide resin A.

Relative Viscosity

First 0.2 g of the polyamide A was precisely weighed and dissolved in 20 mL of 96 mass % aqueous sulfuric acid solution by stirring at 25° C. After complete dissolution, 5 mL of the solution was quickly taken into a Cannon-Fenske viscometer, allowed to stand in a constant temperature bath at 25° C. for 10 minutes, and then a drop time (t) of the solution was measured. In addition, the drop time (t0) of the 96 mass % aqueous sulfuric acid solution itself was measured under the same conditions. The relative viscosity was calculated from t and t0 by the following equation:

Relative viscosity=$t/t0$

Measurement of Melting Point (Tin) of Polyamide A when Polyamide A and Polyamide B are Melted and Allowed to Reside After the film was produced with a short residence time, which is less likely to affect the melting point, the melting point was measured by allowing the film to reside for 20 minutes with a differential scanning calorimeter.

Specifically, a film sample was produced using a film extruder including a single-screw extruder with 25-mm diameter and L/D=25, a head equipped with a 600-mesh filter, and a T-die; and a take-up device equipped with a cooling roll and a winding machine. Specifically, the extruder (PTM25, available from Research Laboratory of Plastics Technology Co., Ltd.) was set at 260° C., and the T-die was set at 265° C. After the polyamide A and the polyamide B were dry-blended in blending amounts described in Table 1 or Table 2, the blend was charged into the extruder. The screw rotation number was set at 60 rpm, and the polyamide resin composition was extruded into a film shape with a residence time of 2 minutes (defined as the time required from when the polyamide resin composition in the hopper reaches the root of the screw of the extruder until the polyamide resin composition exits the die). The take-up speed was adjusted, and a film having a width of 15 cm and a thickness of 250 μm was obtained.

To reproduce the melt residence in the extruder in simulation, 3 mg of the resulting film was then allowed to reside at 260° C. under a nitrogen stream for 20 minutes using a differential scanning calorimeter (DSC-60, available from Shimadzu Corporation) and cooled rapidly. Then, differential scanning calorimetry (DSC measurement) was performed at a temperature increase rate of 10° C./min under a nitrogen stream to measure the melting point of the polyamide A after the melt residence in the extruder in simulation.

Aliphatic Polyamide Resin B (Polyamide B)

B1: Polyamide 6, UBE Nylon 1022B, available from Ube Industries, Ltd., relative viscosity of 3.4

B2: Polyamide 6, UBE Nylon 1024B, available from Ube Industries, Ltd., relative viscosity of 3.5

B3: Polyamide 6,66, Novamid 2030FC, available from DSM Co., Ltd., relative viscosity of 2.7

B4: Polyamide PA12, UBE Nylon 3030U, available from Ube Industries, Ltd., relative viscosity of 2.3

Example 1

An easily tearable film was produced using a film extruder including a 25-mmφ single-screw extruder, a head equipped with a 600-mesh filter, and a T-die; and a take-up device equipped with a cooling roll, a winding machine, and the like.

The extruder was set at 280° C., and the T-die was set at 285° C. After 30 mass % of the polyamide A6 and 70 mass % of the polyamide B2 were dry-blended, the blend was charged into the extruder. The screw rotation number was set at 15 rpm, and the polyamide resin composition was extruded into a film shape with a residence time of 5 minutes. The take-up speed was adjusted, and an unstretched film having a width of 15 cm and a thickness of 180 μm was obtained.

The resulting unstretched film was retained in a clip simultaneous biaxial stretching machine at a preheating spray temperature of 90° C. and a preheating furnace body temperature of 95° C. for 10 seconds. Thereafter, the film was stretched 3.0 times in the vertical axis direction and 3.0 times in the horizontal axis direction and then subjected to a heat fixation treatment in a tenter oven at 210° C. for 30 seconds.

The resulting biaxially stretched film (easily tearable film, thickness of 20 μm) was evaluated for linear cuttability. The obtained results are shown in Table 1.
Evaluation Method of Linear Cuttability A straight line was drawn in the MD direction of the easily tearable film obtained above, and two straight lines were drawn in the TD direction. The distance between the two straight lines in the TD direction was 20 cm. The displacement width (unit: mm) in the TD direction when the film was torn 20 cm in the MD direction was defined as the linear cuttability. A smaller value indicates better linear cuttability.
Oxygen Permeability Coefficient The easily tearable film obtained above was measured for oxygen permeability coefficient under an atmosphere of 23° C. and a relative humidity (RH) of 60% by an isopiestic method in accordance with ASTM-D3985.

The oxygen permeability coefficient was measured using an oxygen permeability coefficient measuring device (product name: "OX-TRAN (trade name) 2/21", available from MOCON, Inc.).
Tensile Elastic Modulus The easily tearable film obtained above was measured for tensile elastic modulus (unit: GPa) in accordance with ASTM-D882.

A strip-shaped test piece having a width of 10 mm and a length of 120 mm was produced from the film obtained above, and the test piece was measured in an environment of 23° C. and 50% relative humidity (RH) using a Strograph V1-C (available from Toyo Seiki Seisaku-sho, Ltd.) under conditions of an inter-chuck distance of 50 mm and a tensile speed of 50 mm/min.

Examples 2 to 9 and Comparative Examples 1 to 3 and 5 to 7

In Example 1, the types and blending amounts (mass ratio in Tables) of the polyamide A and the polyamide B were changed as shown in Table 1 or Table 2, and others were performed in the same manner.

Comparative Example 4

In Example 1, the types and blending amounts of the polyamide A and the polyamide B were changed as shown in Table 2, the molding method of the easily tearable film was changed as follows, and others were performed in the same manner.
Molding of Easily Tearable Film An easily tearable film was produced using a film extruder including a 25-mmφ single-screw extruder, a head equipped with a 600-mesh filter, and a T-die; and a take-up device equipped with a cooling roll, a winding machine, and the like.

The extruder was set at 280° C., and the T-die was set at 285° C. After 10 mass % of the polyamide A5 and 90 mass % of the polyamide B2 were dry-blended, the blend was charged into the extruder. The screw rotation number was set at 15 rpm, and the polyamide resin composition was extruded into a film shape with a residence time of 5 minutes. The take-up speed was adjusted, and an unstretched film having a width of 15 cm and a thickness of 180 μm was obtained.

When the resulting unstretched film was biaxially stretched in the same manner as in Example 1 in a clip simultaneous biaxial stretching machine, the film broke during stretching, and a biaxially stretched film was not obtained. Accordingly, the stretching conditions were changed. That is, the resulting unstretched film was retained at a preheating spray temperature of 170° C. and a preheating furnace body temperature of 170° C. for 5 seconds, then the film was stretched 3.0 times in the vertical axis direction and 3.0 times in the horizontal axis direction, and then subjected to a heat fixation treatment in a tenter oven at 210° C. for 30 seconds. The resulting film was measured for linear cuttability, oxygen permeability coefficient, and tensile elastic modulus in the same manner as described above.

TABLE 1

|  |  | Unit | Example 1 | Example 2 | Example 3 | Example 4 | Example 5 | Example 6 | Example 7 | Example 8 |
|---|---|---|---|---|---|---|---|---|---|---|
| Mass ratio (polyamide A/polyamide B) | | | 30/70 | 30/70 | 30/70 | 70/30 | 30/70 | 30/70 | 30/70 | 30/70 |
| Polyamide A | | | A6 | A4 | A5 | A5 | A7 | A8 | A5 | A5 |
| Polyamide B | | | B2 | B2 | B2 | B2 | B2 | B2 | B1 | B3 |
| Properties of polyamide A | P atom concentration | μmol/g | 4.7 | 4.9 | 0.2 | 0.2 | 4.9 | 4.9 | 0.2 | 0.2 |
| | Na atom concentration | μmol/g | 17.5 | 8.1 | 0.3 | 0.3 | 8.1 | 8.1 | 0.3 | 0.3 |
| | K atom concentration | μmol/g | 0 | 0 | 0 | 0 | 9.0 | 0 | 0 | 0 |
| | Ca atom concentration | μmol/g | 0 | 0 | 0 | 0 | 0 | 4.0 | 0 | 0 |

TABLE 1-continued

|  | Unit | Example 1 | Example 2 | Example 3 | Example 4 | Example 5 | Example 6 | Example 7 | Example 8 |
|---|---|---|---|---|---|---|---|---|---|
| Mn | g/μmol | 0.0226 | 0.0348 | 0.0225 | 0.0225 | 0.0229 | 0.0229 | 0.0225 | 0.0225 |
| [P × n − (X × 1 + Y × 2)]/Mn | (μmol/g)$^2$ | −356.3 | 46.8 | 2.4 | 2.4 | −322.6 | −278.8 | 2.4 | 2.4 |
| DSC melting point of polyamide A (20 min residence) | °C. | 232.6 | 232.9 | 233.3 | 234.8 | 232.4 | 232.5 | 233.1 | 233.0 |
| Linear cuttability (285° C. molded article) | mm | 4.1 | 3.8 | 3.3 | 3.5 | 4.2 | 4.2 | 3.4 | 3.4 |
| Oxygen permeability coefficient | cc · mm/m$^2$ · day · atm | 0.26 | 0.25 | 0.25 | 0.12 | 0.26 | 0.26 | 0.25 | 0.24 |
| Tensile elastic modulus | GPa | 2.0 | 2.0 | 2.0 | 2.6 | 2.0 | 2.0 | 2.0 | 1.9 |

TABLE 2

|  |  | Unit | Example 9 | Comparative Example 1 | Comparative Example 2 | Comparative Example 3 | Comparative Example 4 |
|---|---|---|---|---|---|---|---|
| Mass ratio polyamide A/polyamide B) |  |  | 30/70 | 30/70 | 30/70 | 30/70 | 10/90 |
| Polyamide A |  |  | A5 | A1 | A2 | A3 | A5 |
| Polyamide B |  |  | B4 | B2 | B2 | B2 | B2 |
| Properties of polyamide A | P atom concentration | μmol/g | 0.2 | 11.2 | 4.9 | 4.9 | 0.2 |
|  | Na atom concentration | μmol/g | 0.3 | 18.7 | 8.1 | 8.1 | 0.3 |
|  | K atom concentration | μmol/g | 0 | 0 | 0 | 0 | 0 |
|  | Ca atom concentration | μmol/g | 0 | 0 | 0 | 0 | 0 |
|  | Mn | g/μmol | 0.0225 | 0.0185 | 0.0146 | 0.0229 | 0.0225 |
|  | [P × n − (X × 1 + Y × 2)]/Mn | (μmol/g)$^2$ | 2.4 | 203.0 | 112.0 | 71.1 | 2.4 |
|  | DSC melting point of polyamide A (20 min residence) | °C. | 235.9 | 230.4 | 230.7 | 230.9 | 232.3 |
| Linear cuttability (285° C. molded article) |  | mm | 2.2 | 6.7 | 6.3 | 6.1 | 6.9 |
| Oxygen permeability coefficient |  | cc · mm/m$^2$ · day · atm | 3.0 | 0.38 | 0.36 | 0.35 | 0.55 |
| Tensile elastic modulus |  | GPa | 1.9 | 2.0 | 2.0 | 2.0 | 1.8 |

|  |  | Unit | Comparative Example 5 | Comparative Example 6 | Comparative Example 7 |
|---|---|---|---|---|---|
| Mass ratio polyamide A/polyamide B) |  |  | 30/70 | 77/23 | 20/80 |
| Polyamide A |  |  | A3 | A5 | A5 |
| Polyamide B |  |  | B3 | B2 | B2 |
| Properties of polyamide A | P atom concentration | μmol/g | 4.9 | 0.2 | 0.2 |
|  | Na atom concentration | μmol/g | 8.1 | 0.3 | 0.3 |
|  | K atom concentration | μmol/g | 0 | 0 | 0 |
|  | Ca atom concentration | μmol/g | 0 | 0 | 0 |
|  | Mn | g/μmol | 0.0229 | 0.0225 | 0.0225 |
|  | [P × n − (X × 1 + Y × 2)]/Mn | (μmol/g)$^2$ | 71.1 | 2.4 | 2.4 |
|  | DSC melting point of polyamide A (20 min residence) | °C. | 231.0 | 234.8 | 233.1 |
| Linear cuttability (285° C. molded article) |  | mm | 6.1 | 3.5 | 3.6 |
| Oxygen permeability coefficient |  | cc · mm/m$^2$ · day · atm | 0.34 | 0.10 | 0.33 |
| Tensile elastic modulus |  | GPa | 1.9 | 3.4 | 1.9 |

Only Na and K concentrations are described in the table for the alkali metal atom concentration of the polyamide A, but no other alkali metal atom was detected in all the examples and the comparative examples. In addition, only Ca concentration is described in the table for the alkaline earth metal atom concentration, but no other alkaline earth metal atom was detected.

As is clear from the above results, in the easily tearable film of the present invention, it was found that an easily tearable film with excellent linear cuttability, high oxygen barrier properties, low elastic modulus, and excellent flexibility (Examples 1 to 9) is obtained.

The melting point of the polyamide A in the easily tearable film is an indicator of the degree of miscibilization of the polyamide A and the polyamide B constituting the film, which indicates that the smaller the degree of melting point reduction of the polyamide A in the film from that of the original resin, the more the miscibilization is prevented. The melting point of the polyamide A (polymetaxylene adipamide) as a resin is 237° C. In contrast to this, in Comparative Examples 1 to 3, the melting point from the polyamide A significantly decreased to 230.4 to 230.9° C. In contrast to them, the melting points in all the Examples were 232.5° C. or higher, indicating that the decrease of the melting point was prevented (improved even from 1.6 to 3.24° C. over the Comparative Examples). From this, it can be seen that in the examples of the present invention, the miscibilization of the polyamide A and the polyamide B is prevented.

In addition, it can be said that the increase of the melting point of the polyamide A by 1° C. or higher when it resides for 20 minutes clearly makes a significant difference. Thus, it can be said that the composition of the present invention when it resides for 20 minutes has a significantly increased melting point, and the miscibilization is significantly prevented.

This point is more apparent from FIG. 2. That is, FIG. 2 plots the relationship between the value of Equation (1) and the melting point of the polyamide A after residing for 20 minutes, where the diamonds in FIG. 2 plot Examples 1 to 7, and the squares plot Comparative Examples 1 to 3. Depending on whether Formula (1) was satisfied, the melting point of the semi-aromatic polyamide resin A was able to be remarkably increased, and as a result, excellent linear cuttability was achieved.

In addition, films with the blend ratio of the polyamide A and the polyamide B being out of the range of the present invention (particularly, Comparative Example 4, Comparative Example 6, and Comparative Example 7) had poor linear cuttability, or poor oxygen permeability coefficient or poor tensile elastic modulus even if having excellent linear cuttability.

REFERENCE SIGNS LIST

1 Semi-aromatic polyamide resin A
2 Aliphatic polyamide resin B
3 Polyester resin layer
4 Adhesive layer
5 Intermediate layer
6 Adhesive layer
7 Polyolefin resin layer

The invention claimed is:

1. An easily tearable film comprising polyamide resin components comprising more than 20 parts by mass and 70 parts by mass or less of a semi-aromatic polyamide resin A and less than 80 parts by mass and 30 parts by mass or more of an aliphatic polyamide resin B, with the proviso that a sum of the semi-aromatic polyamide resin A and the aliphatic polyamide resin B is 100 parts by mass;
wherein the semi-aromatic polyamide resin A is constituted of a diamine-derived constituent unit and a dicarboxylic acid-derived constituent unit;
60 mol % or more of the diamine-derived constituent units are derived from metaxylylenediamine;
60 mol % or more of the dicarboxylic acid-derived constituent units are derived from an $\alpha,\omega$-linear aliphatic dicarboxylic acid having from 4 to 10 carbons;
the semi-aromatic polyamide resin A satisfies Equation (1) below; and the easily tearable film is stretched;

$$[\text{molar concentration of phosphorus atoms} \times n - (\text{total molar concentration of alkali metal atoms} \times 1 + \text{total molar concentration of alkaline earth metal atoms} \times 2)]/Mn \leq 60 \quad (1)$$

where the molar concentration of phosphorus atoms means molar concentration of phosphorus atoms of a phosphoric acid-related compound contained in the semi-aromatic polyamide resin A; the total molar concentration of the alkali metal atom and the total molar concentration of the alkaline earth metal atom mean respectively a total molar concentration of alkali metal atoms or a total molar concentration of alkaline earth metal atoms contained in the semi-aromatic polyamide resin A, both in µmol/g; the phosphoric acid-related compound is selected from phosphoric acid and salts thereof, phosphorous acid and salts thereof, and hypophosphorous acid and salts thereof; n means the number of releasable protons of the phosphoric acid-related compound; and Mn means a number average molecular weight of the semi-aromatic polyamide resin A in g/µmol.

2. The easily tearable film according to claim 1, wherein the number average molecular weight of the semi-aromatic polyamide resin A is from 0.019 to 0.050 g/µmol.

3. The easily tearable film according to claim 1, wherein a constituent unit comprising a linear alkylene chain having from 4 to 6 carbons accounts for 80 mol % or more of all the constituent units of the aliphatic polyamide resin B.

4. The easily tearable film according to claim 1, wherein the aliphatic polyamide resin B comprises polyamide 6.

5. The easily tearable film according to claim 1, wherein 60 mol % or more of the dicarboxylic acid-derived constituent units are derived from adipic acid.

6. The easily tearable film according to claim 1, wherein a melting point of the semi-aromatic polyamide resin A when the semi-aromatic polyamide resin A and the aliphatic polyamide resin B are kneaded and extruded for a residence time of 20 minutes is at least 1.0° C. higher than a melting point of a semi-aromatic polyamide resin C when the semi-aromatic polyamide resin C and the aliphatic polyamide resin B are kneaded and extruded for a residence time of 20 minutes;
where the semi-aromatic polyamide resin C is a semi-aromatic polyamide resin constituted of the same composition of the diamine and the dicarboxylic acid as that of the semi-aromatic polyamide resin A, and is a resin satisfying 230≥[molar concentration of phosphorus atoms×n−(total molar concentration of alkali metal atoms×1+total molar concentration of alkaline earth metal atoms×2)]/Mn>60.

7. A multilayer film comprising the easily tearable film described in claim 1.

8. The multilayer film according to claim 7, comprising a polyester resin layer, the easily tearable film, and a polyolefin resin layer in this order.

9. A packaging material comprising the easily tearable film described in claim 1.

10. A container comprising the easily tearable film described in claim 1.

11. A packaging material comprising the multilayer film described in claim 7.

12. A container comprising the multilayer film described in claim 7.

* * * * *